United States Patent
Matsunaga

(10) Patent No.: US 9,505,073 B2
(45) Date of Patent: Nov. 29, 2016

(54) ELECTRIC DISCHARGE MACHINE

(71) Applicant: FANUC Corporation, Yamanashi (JP)

(72) Inventor: Tomoaki Matsunaga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 14/525,382

(22) Filed: Oct. 28, 2014

(65) Prior Publication Data

US 2015/0114936 A1    Apr. 30, 2015

(30) Foreign Application Priority Data

Oct. 30, 2013    (JP) .................................. 2013-225936

(51) Int. Cl.
| | | |
|---|---|---|
| *B23H 11/00* | (2006.01) | |
| *B23H 7/04* | (2006.01) | |
| *B23H 7/20* | (2006.01) | |
| *B23H 1/02* | (2006.01) | |

(52) U.S. Cl.
CPC ................. *B23H 11/00* (2013.01); *B23H 7/04* (2013.01); *B23H 1/02* (2013.01); *B23H 7/20* (2013.01)

(58) Field of Classification Search
USPC ....................................... 219/69.13; 204/279
See application file for complete search history.

(56) References Cited

U.S. PATENT DOCUMENTS

| | | |
|---|---|---|
| 6,507,760 B1 | 1/2003 | Baumgartner |
| 2005/0115928 A1 | 6/2005 | Arakawa et al. |
| 2007/0051701 A1 | 3/2007 | Ogata et al. |

FOREIGN PATENT DOCUMENTS

| | | |
|---|---|---|
| EP | 0505570 A1 | 9/1992 |
| JP | 61-136736 A | 6/1986 |
| JP | 63-134121 A | 6/1988 |
| JP | 64-19408 A | 1/1989 |
| JP | 2-110429 U | 9/1990 |
| JP | 2-262915 A | 10/1990 |
| JP | 4-122524 A | 4/1992 |
| JP | 2005-153128 A | 6/2005 |

OTHER PUBLICATIONS

Office Action mailed Mar. 24, 2015, corresponding to Japanese patent application No. 2013-225936.
"CNC Machine Controller JY5300", User Guide V1.1 2001, Nov. 30, 2012, Retrieved from the Internet: http://www.mib-tech.com/dy5300.html.
Extended European Search Report mailed Jun. 5, 2015, corresponding to European patent application No. 14188105.2.

*Primary Examiner* — Dana Ross
*Assistant Examiner* — Renee LaRose
(74) *Attorney, Agent, or Firm* — Hauptman Ham, LLP

(57) ABSTRACT

An electric discharge machine has a hand operation panel, which is provided with a manual pulse generator with a rotating part. The manual pulse generator generates a pulse signal corresponding to a rotation angle position of the rotating part. Further, the manual pulse generator outputs a move command for changing (i.e., increasing or decreasing) a relative distance between a tool electrode and a workpiece and commands for changing set values of machining conditions, based on the pulse signal from the manual pulse generator.

6 Claims, 3 Drawing Sheets

ELECTRIC DISCHARGE MACHINE

RELATED APPLICATIONS

The present application claims priority to Japanese Application Number 2013-225936, filed Oct. 30, 2013, the disclosure of which is hereby incorporated by reference herein in its entirety.

BACKGROUND OF THE INVENTION

Field of the Invention

The present invention relates to a wire electric discharge machine comprising a hand operation panel.

Description of the Related Art

In a wire electric discharge machine, it is necessary to set axial movement during the machining and machining conditions for controlling electric discharge machining, such as a machining voltage, quiescent time, wire tension, etc.

Japanese Patent Application Laid-Open No. 4-122524 discloses a technique in which machining conditions are selected on a display screen attached to the body of an electric discharge machine and tables are manually positioned using a manual pulse generator. In setting the machining conditions, in particular, according to this technique, values for the machining condition setting are input on the display screen that is located at a distance from the machining position. Therefore, the machining state cannot be observed near the machining position during the machining as the machining conditions are set.

While a hand operation panel is used to move axes and tables according to some conventional techniques, machining conditions are set by inputting values on a control panel. Therefore, the machining state cannot be observed near the machining position during the machining as the machining conditions of an electric discharge machine are set.

In the case where the axes and tables are moved on the hand operation panel, moreover, the hand operation panel is configured so that an axis is moved at a specified speed while a button for the specified speed is being manually depressed. If the axis moving speed is expected to be changed, therefore, it is necessary to manually push a button for another specified speed.

SUMMARY OF THE INVENTION

Accordingly, the object of the present invention is to provide an electric discharge machine capable of improving the operability for the movement of an axis or the like and machining condition setting.

An electric discharge machine according to the present invention has a hand operation panel, which includes a manual pulse generator provided with a rotating part rotatable in clockwise and counterclockwise directions. The manual pulse generator generates a pulse signal corresponding to a rotation angle position of the rotating part. The manual pulse generator is configured to output a move command for changing a relative distance between a tool electrode and a workpiece and commands for changing set values other than the move command, based on the pulse signal from the manual pulse generator.

In the electric discharge machine according to the present invention, the hand operation panel is provided with the manual pulse generator configured to generate the pulse signal corresponding to the rotation angle of the rotating part. The manual pulse generator can output the move command for changing the relative distance between the tool electrode and the workpiece and commands for changing the set values other than the move command. Thus, the commands can be output by setting the rotation angle of the rotating part so that the operability is improved. Also, the set values other than the move command can be handled by means of the hand operation panel, so that the machining state can be observed as the set values are changed.

The hand operation panel may further comprise a changeover switch configured to determine whether to use the pulse signal from the manual pulse generator for the move command for changing the relative distance between the tool electrode and the workpiece or to use the pulse signal for the commands for changing the set values other than the move command.

According to this arrangement, the hand operation panel is provided with the function changeover switch for changeover between the move command and the commands for changing the set values other than the move command, so that the move command for an axis or the like and the commands for changing the set values other than the move command can be output alternatively.

The set values other than the move command may include at least one machining condition of the electric discharge machine. Further, the machining condition may include a machining voltage, a discharge quiescent time, and/or a wire tension.

The hand operation panel may further comprise a display section configured to display an axis feed rate based on the move command and a value of the machining condition.

According to the present invention, there can be provided an electric discharge machine capable of improving the operability for the movement of an axis or the like and machining condition setting.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
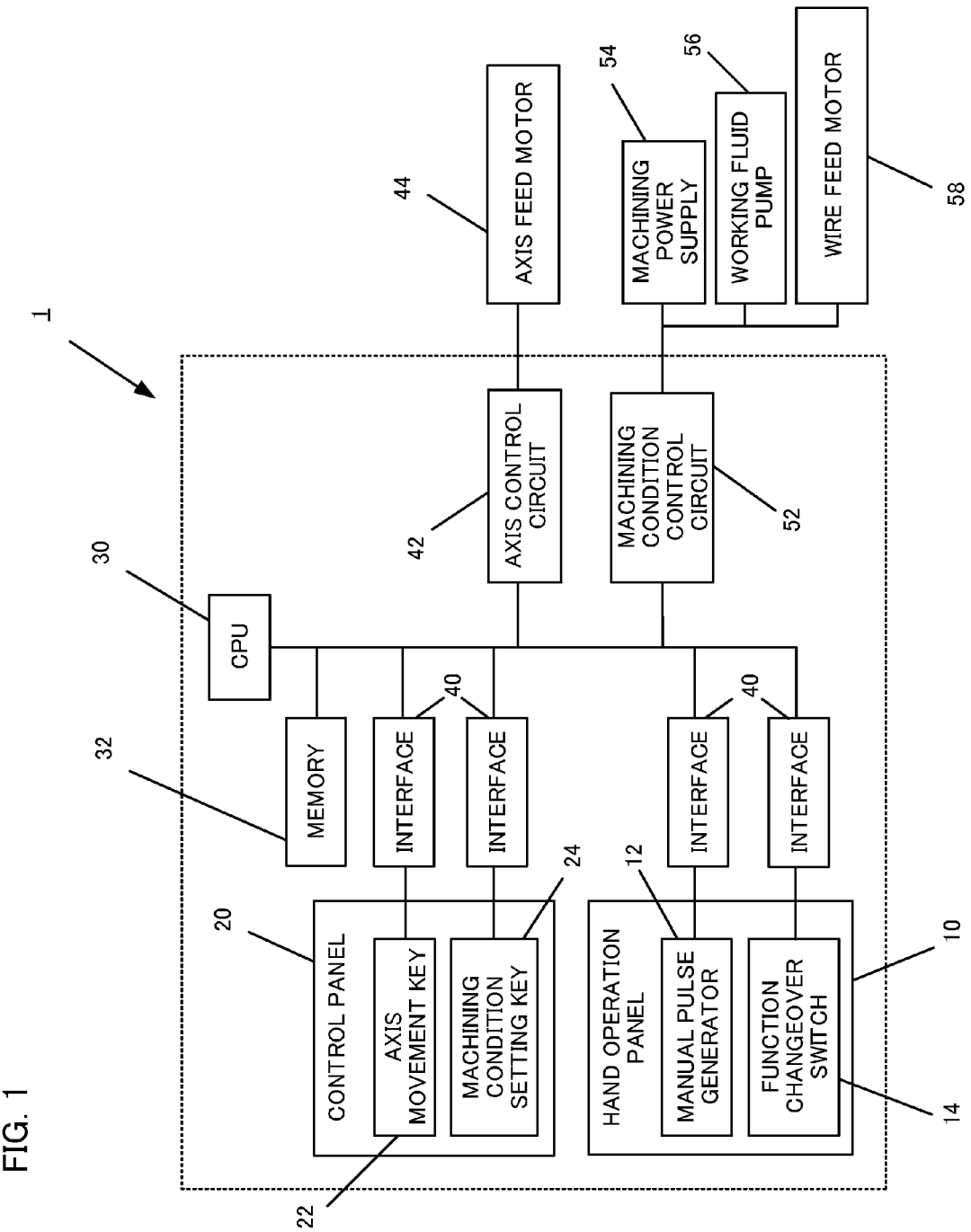
FIG. 1 is a block diagram showing one embodiment of an electric discharge machine according to the present invention.

FIG. 1 is a block diagram showing one embodiment of an electric discharge machine according to the present invention.

A control section 1 of the electric discharge machine comprises a hand operation panel 10, control panel 20, CPU 30, memory 32, axis control circuit 42, and machining condition control circuit 52. The hand operation panel 10 is provided with a manual pulse generator 12, function changeover switch 14, and display section 16 (described later). Further, the control panel 20 is provided with an axis movement key 22 and a machining condition setting key 24.

The CPU 30 is connected, via interfaces 40, with the manual pulse generator 12 and the function changeover switch 14 on the hand operation panel 10 or the axis movement key 22 and the machining condition setting key 24 on the control panel 20. The CPU 30 is also connected with the axis control circuit 42 and the machining condition control circuit 52. Outputs from the manual pulse generator 12, function changeover switch 14, axis movement key 22, and machining condition setting key 24 are input to the CPU 30. Further, the axis control circuit 42 is connected with the an axis feed motor 44, and outputs axis move commands received from the CPU 30 to the axis feed motor 44. Furthermore, the machining condition control circuit 52 is connected with a machining power supply 54, working fluid pump 56, and wire feed motor 58. The machining condition control circuit 52 outputs machining conditions given by the CPU 30 to the machining power supply 54 and the like.

Figure 2:
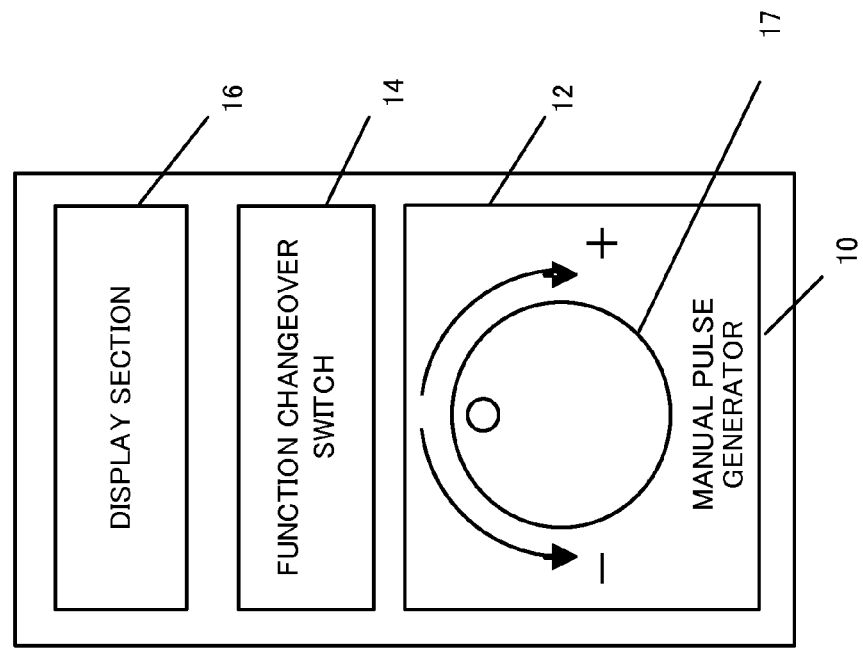
FIG. 2 is a diagram showing a configuration of a hand operation panel in a control section of the electric discharge machine of FIG. 1.

FIG. 2 is a diagram showing a configuration of the hand operation panel 10 shown in FIG. 1.

The hand operation panel 10 is provided with the manual pulse generator 12, which has a rotating part 17 rotatable in clockwise and counterclockwise directions, function changeover switch 14, and display section 16. The manual pulse generator 12 generates pulses proportional to the rotation amount of the rotating part 17. The function changeover switch 14 determines whether to use the pulses generated by the manual pulse generator 12 for axis feed control or for change of machining conditions.

If the pulses generated by the manual pulse generator 12 are determined by the function changeover switch 14 to be used for axis feed control, they are delivered to the CPU 30 through an interface 40. Thereupon, the CPU 30 outputs the axis move commands corresponding to the pulses to the axis control circuit 42.

If the pulses generated by the manual pulse generator 12 are determined by the function changeover switch 14 to be used for machining condition change, in contrast, they are delivered to the CPU 30 through the interface 40. Thereupon, the CPU 30 outputs the machining conditions corresponding to the pulses to the machining condition control circuit 52.

An axis feed rate, values of machining conditions, etc., are displayed on the display section 16.

The manual pulse generator 12 of the hand operation panel 10 generates pulses proportional to the rotation amount of the rotating part 17. If the hand operation panel 10 is used for axis feed control, the rotating part 17 of the manual pulse generator 12 is rotated in the clockwise direction (direction (+)) so that the axis moves in a positive direction or is rotated in the counterclockwise direction (direction (−)) so that the axis moves in a negative direction.

If the hand operation panel 10 is used for machining condition change or the like, in contrast, the rotating part 17 of the manual pulse generator 12 is rotated in the clockwise direction (direction (+)) so that parameters of the machining conditions to be changed are increased by addition, and is rotated in the counterclockwise direction (direction (−)) so that the parameters of the machining conditions to be changed are reduced by subtraction.

The function changeover switch 14 on the hand operation panel 10 may be provided with a plurality of buttons (not shown) so that each function can be changed by pushing the button (switch) corresponding to the function. Alternatively, the hand operation panel 10 may be provided with only a single switch as the function changeover switch 14 so that the function can be changed each time the switch is pushed.

Figure 3:
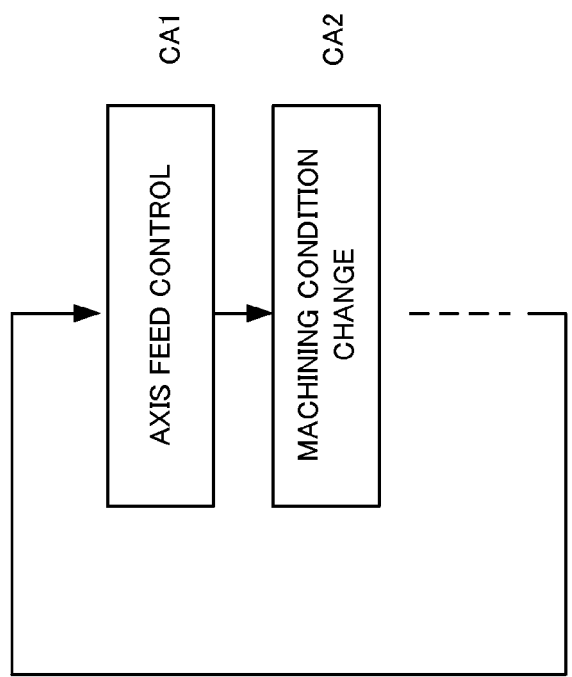
FIG. 3 is a diagram illustrating a configuration of the hand operation panel of FIG. 2 in which its function changeover switch is provided with only a single button such that an axis feed control function, as a first function CA1, and a machining condition change function, as a second function CA2, are alternately changed each time the button is pushed.

FIG. 3 is a diagram illustrating a configuration of the hand operation panel 10 of FIG. 2 in which its function changeover switch 14 is provided with only a single button (not shown) such that an axis feed control function, as a first function CA1, and a machining condition change function, as a second function CA2, are alternately changed each time the button is pushed.

Figure 4:
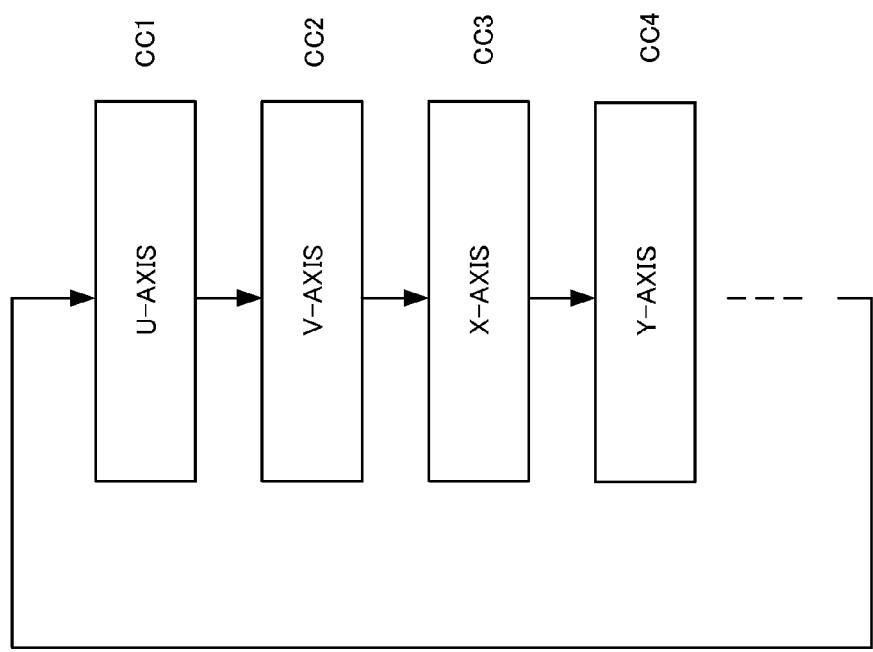
FIG. 4 is a diagram showing how machining conditions are changed by the function changeover switch.

FIG. 4 is a diagram showing how the machining conditions are changed by the function changeover switch 14.

The function changeover switch 14 on the hand operation panel 10 may be provided with a plurality of buttons for machining condition change, as well as for function change shown in FIG. 3, so that the machining conditions can be changed by pushing the buttons corresponding to the machining conditions, individually. Alternatively, the function changeover switch 14 may be provided with only a single button such that the machining conditions can be sequentially changed each time the button is pushed. The example of FIG. 4 is configured so that a machining voltage (first machining condition CB1), discharge quiescent time (second machining condition CB2), wire tension (third machining condition CB3), and working fluid pressure (fourth machining condition CB4) are sequentially changed.

In the arrangement described above, the function changeover switch 14 is configured to determine whether to use the pulses generated by the manual pulse generator 12 for axis feed control (or to change over to the axis feed control function) or for change of machining conditions (or to change over to the machining condition change function). However, the function changeover switch 14 is not limited to the changeover between these two functions, and may alternatively be used for the change of other set values, such as the water level of a working tank of the electric discharge machine, the specific resistance of a working fluid, and the like (set value change function).

Figure 5:
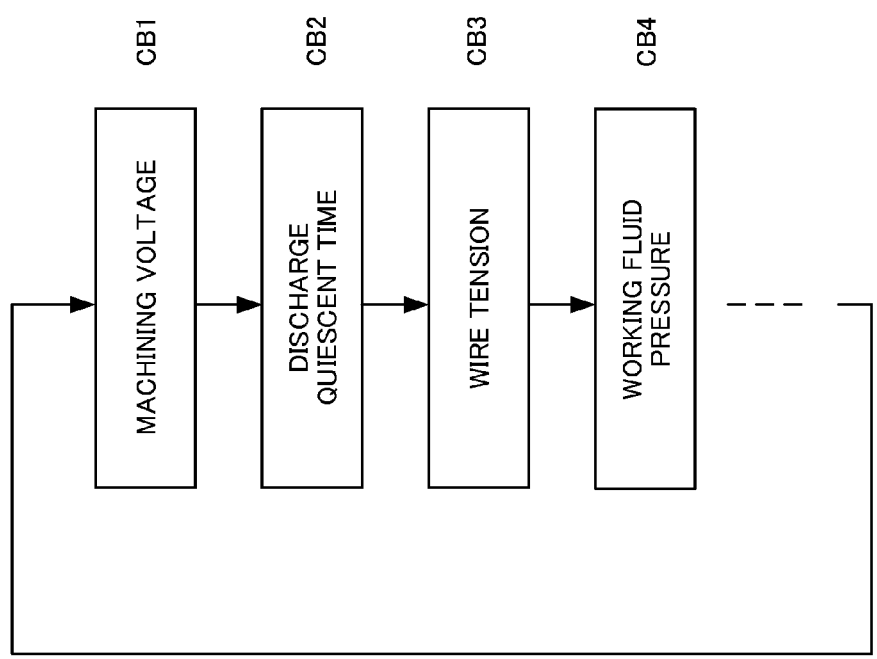
FIG. 5 is a diagram showing an example of axis feed control (change of an axis movement function) by means of the function changeover switch on the hand operation panel of FIG. 2.

FIG. 5 is a diagram showing an example of axis feed control (change of an axis movement function) by means of the function changeover switch 14.

The function changeover switch 14 on the hand operation panel 10 may be provided with a plurality of buttons for axis feed control (change of the axis movement function), as well as for the function change shown in FIG. 3, so that the axis movement function can be changed by pushing the buttons corresponding to the axis movement functions, individually. Alternatively, the function changeover switch 14 may be provided with only a single button for axis feed control (change of the axis movement function) such that the axis movement function can be sequentially changed each time the button is pushed. The example of FIG. 5 is configured so that a U-axis (first axis CC1), V-axis (second axis CC2), X-axis (third axis CC3), and Y-axis (fourth axis CC4) are sequentially changed over to one another as an object of axis feed control each time the button is pushed.

Thus, according to the present invention, the axis feed control (axis movement function), which has conventionally been changed by pushing a button on the hand operation panel, is performed (i.e., a pulse signal is generated) depending on the rotation angle of the rotating part that constitutes the manual pulse generator of the hand operation panel. Specifically, the rotating part is quickly rotated when the axis subject to the axis feed control is expected to be quickly moved, and is slowly rotated when the target axis is expected to be slowly moved. In this way, the operability is improved compared with the case where the buttons are used for this purpose.

Further, the hand operation panel enables adjustments, such as machining condition change, other than the axis feed control (axis movement function). Therefore, the machining state can be observed as the machining conditions are changed, and the control panel in a remote place need not be accessed in changing the machining conditions, so that the operability is improved.

The invention claimed is:

1. An electric discharge machine, comprising:
a hand operation panel; wherein
the hand operation panel has a manual pulse generator including a rotating part rotatable in clockwise and counterclockwise directions,
the manual pulse generator is configured to generate a pulse signal corresponding to a rotation angle position of the rotating part,
the manual pulse generator is configured to switch between and output any one of a move command for changing a relative distance between a tool electrode and a workpiece and commands for changing set values other than the move command, based on the pulse signal from the manual pulse generator.

2. The electric discharge machine according to claim 1, wherein the hand operation panel further comprises a changeover switch configured to determine whether to use the pulse signal from the manual pulse generator for the move command for changing the relative distance between the tool electrode and the workpiece or to use the pulse signal for the commands for changing the set values other than the move command.

3. The electric discharge machine according to claim 2, wherein the set values other than the move command include at least one machining condition of the electric discharge machine.

4. The electric discharge machine according to claim 3, wherein the hand operation panel further comprises a display section configured to display an axis feed rate based on the move command and a value of the machining condition.

5. The electric discharge machine according to claim 3, wherein the machining condition includes a machining voltage, a discharge quiescent time, and/or a wire tension.

6. A hand operation panel for an electric discharge machine, comprising:
a manual pulse generating section that includes a dial rotatable by manual operation in clockwise and counterclockwise directions;
a function changeover section that includes at least one switch for changing machining condition and at least one switch for controlling axis feed;
displaying section that displays the data output from the function changeover section on a screen;
wherein the magnitude of a machining condition selected by pushing any one of the switches for changing machining condition and the magnitude of axis feed selected by pushing any one of the switches for controlling axis feed are changed continuously dependent on the rotation amount and rotation direction of the dial.

* * * * *